US012259802B2

(12) United States Patent
Podolski et al.

(10) Patent No.: US 12,259,802 B2
(45) Date of Patent: Mar. 25, 2025

(54) ENTITY COMPONENT SYSTEM UTILIZATION FOR DATA CENTER AND HARDWARE PERFORMANCE ANALYTICS

(71) Applicant: United Parcel Service of America, Inc., Atlanta, GA (US)

(72) Inventors: Peter Podolski, Atlanta, GA (US); Steffen Chirichiello, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 172 days.

(21) Appl. No.: 18/061,787

(22) Filed: Dec. 5, 2022

(65) Prior Publication Data

US 2024/0184681 A1 Jun. 6, 2024

(51) Int. Cl.
| | |
|---|---|
| G06F 9/44 | (2018.01) |
| G06F 9/445 | (2018.01) |
| G06F 9/54 | (2006.01) |
| G06F 11/30 | (2006.01) |
| G06F 11/34 | (2006.01) |

(52) U.S. Cl.
CPC ...... *G06F 11/3409* (2013.01); *G06F 9/44505* (2013.01); *G06F 9/542* (2013.01); *G06F 11/3006* (2013.01)

(58) Field of Classification Search
CPC .. G06F 11/3409; G06F 9/44505; G06F 9/542; G06F 11/3006
See application file for complete search history.

(56) References Cited

U.S. PATENT DOCUMENTS

| | | | |
|---|---|---|---|
| 2002/0175956 A1* | 11/2002 | Hand | H04L 41/22 715/853 |
| 2018/0217879 A1* | 8/2018 | Garcia | G06F 11/0709 |
| 2020/0104865 A1* | 4/2020 | Bhasin | G06Q 20/202 |

OTHER PUBLICATIONS

European search report received for European Application No. 23210119.6, mailed on May 2, 2024, 9 pages.
Hatledal et al., "Vico: An entity-component-system based co-simulation framework", Simulation Modelling Practice and Theory, vol. 108, Dec. 23, 2020. 14 pages.

* cited by examiner

*Primary Examiner* — Zahid Choudhury
(74) *Attorney, Agent, or Firm* — Shook, Hardy & Bacon L.L.P.

(57) ABSTRACT

Embodiments of the present disclosure provide systems, methods, and computer storage media for providing data monitoring and analysis of a data center using an Entity-Component-System (ECS) architecture. Embodiments of the disclosure provide mechanisms for initializing the ECS architecture by associating devices and data metrics relating to the data center as entities and components. During run-time, the components are continuously updated with collected data metrics and the state of the entities are analyzed by the systems to determine if an event has occurred that requires a remedial action be performed. The events correspond to events occurring on the data center as they relate to the devices associated with the entities. Actions correspond to steps that are taken to rectify the event.

15 Claims, 6 Drawing Sheets

ENTITY COMPONENT SYSTEM UTILIZATION FOR DATA CENTER AND HARDWARE PERFORMANCE ANALYTICS

BACKGROUND

The present disclosure relates to data center monitoring and performance analytics and, more specifically, to implementing an entity-component-system framework that performs data center and hardware performance analytics.

Monitoring and data analysis are fundamental elements of data center management. Monitoring tracks desired hardware and software metrics. The analysis evaluates these metrics to identify system or application states for troubleshooting, resource provisioning, or other management actions. Effective monitoring and analysis require that monitoring and associated analytics be performed in real-time and that these mechanisms are scalable to tens of thousands of heterogenous nodes with complex network and input/output (I/O) structures. The data used for the analyses are captured by various tools, operating in specific subsystems, running at different levels of abstraction, on entire parallel machines, or addressing the distributed nature of underlying infrastructures.

SUMMARY

Embodiments of the present disclosure include a computer-implemented method, a non-transitory computer storage medium, and a computerized system for data monitoring and analysis of a data center using an Entity-Component-System ("ECS") architecture. Embodiments of the disclosure provide mechanisms for initializing the ECS architecture by associating devices and data metrics relating to the data center as entities and components. During runtime, the components are continuously updated with collected data metrics. The systems analyze the state of the entities to determine if an event has occurred that may require remedial action. The events correspond to events occurring in the data center as they relate to the devices associated with the entities. Actions correspond to steps that are taken to rectify the event.

In some embodiments, the computerized system comprises one or more processors and computer storage memory having computer-executable instructions stored thereon, which, when executed by the one or more processors, implement operations comprising the following steps. A monitoring and analysis system initializes an ECS architecture using information gathered from a data center communicatively coupled with the monitoring and analysis system. The ECS architecture includes entities corresponding to devices operating within the data center, components corresponding to data metrics of the data center collected by the monitoring and analysis system, and systems for performing data analysis on the components of the entities to detect events occurring on the data center. A data monitor, via a communication network, collects data metrics generated in-real time from the data center and populates the components with their corresponding data metric. The systems continuously, or on a predefined interval, perform an analysis of the data metrics directly stored by the components to determine state changes of the entities. Upon determination that a state change of an entity indicates an event, the system performs a remedial action causing the state of the entity to alter based on the event.

In some embodiments, the computer-implemented method includes the following operations. A monitoring and analysis system initializes an ECS architecture using information gathered from a data center communicatively coupled with the monitoring and analysis system. The ECS architecture includes entities corresponding to devices operating within the data center, components corresponding to data metrics of the data center collected by the monitoring and analysis system, and systems for performing data analysis on the components of the entities to detect events occurring on the data center. A data monitor, via a communication network, collects data metrics generated in-real time from the data center and populates the components with their corresponding data metric. The systems continuously, or on a predefined interval, perform an analysis of the data metrics directly stored by the components to determine state changes of the entities. Upon determination that a state change of an entity indicates an event, the system performs a remedial action causing the state of the entity to alter based on the event.

In some embodiments, the one or more computer storage media includes computer-executable instructions embodied thereon that, when executed, by one or more processors, cause the one or more processors to perform the following operations. A monitoring and analysis system initializes an ECS architecture using information gathered from a data center communicatively coupled with the monitoring and analysis system. The ECS architecture includes entities corresponding to devices operating within the data center, components corresponding to data metrics of the data center collected by the monitoring and analysis system, and systems for performing data analysis on the components of the entities to detect events occurring on the data center. A data monitor, via a communication network, collects data metrics generated in-real time from the data center and populates the components with their corresponding data metric. The systems continuously, or on a predefined interval, perform an analysis of the data metrics directly stored by the components to determine state changes of the entities. Upon determination that a state change of an entity indicates an event, the system performs a remedial action causing the state of the entity to alter based on the event.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the embodiments of the disclosure will become better understood with regard to the following description, appended claims, and accompanying drawings where:

Figure 1:
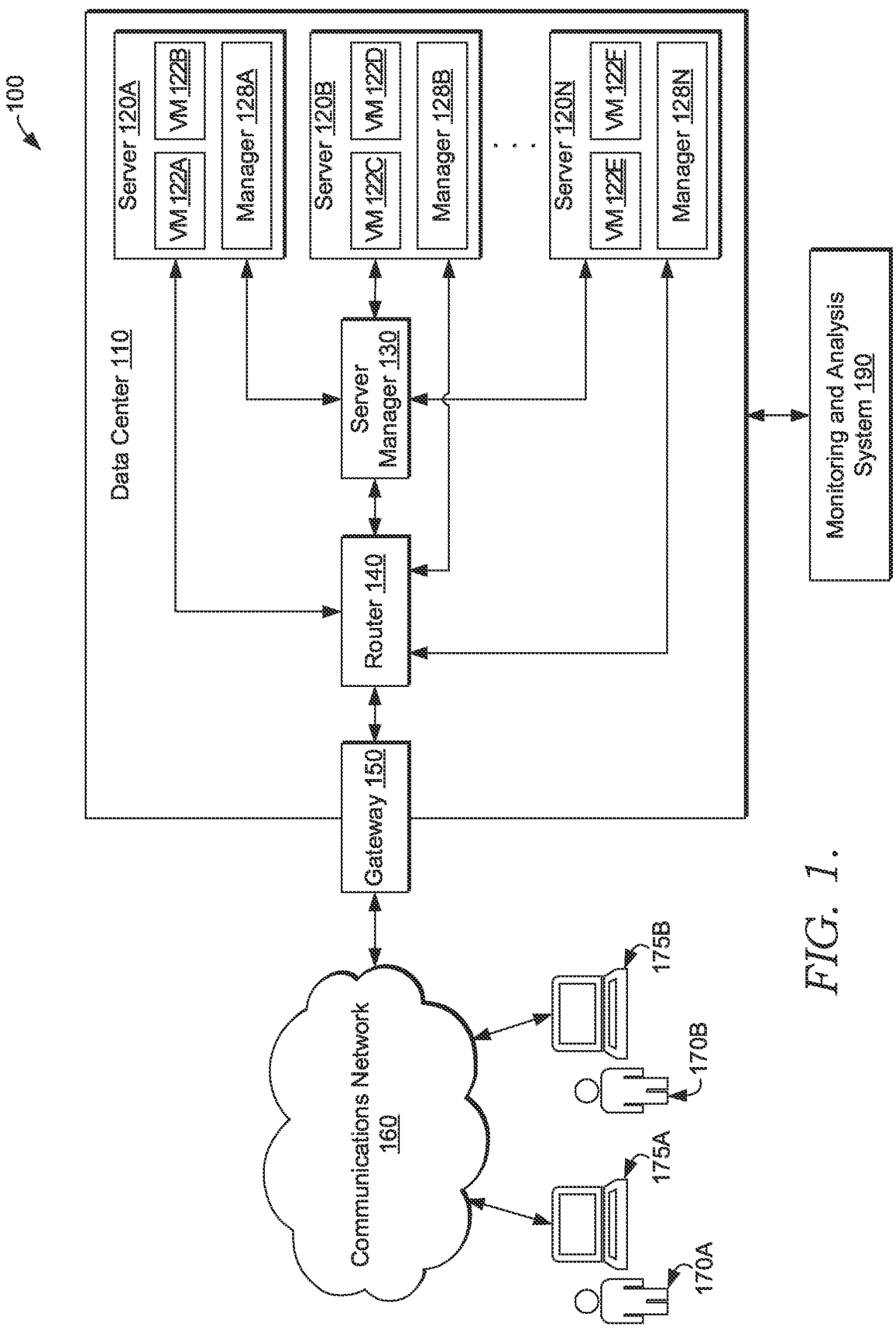
FIG. 1 is a block diagram of an example data center environment in accordance with embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to data center monitoring and performance analytics and, more specifically, to implementing an entity-component-system framework that performs data center and hardware performance analytics. While the present disclosure is not necessarily limited to such applications, various aspects of the disclosure may be appreciated through a discussion of various examples using this context.

I. Overview

Data centers are structures or grouped structures dedicated to the centralized accommodation, operation, and interconnection of information and communications technology equipment providing data storage, processing, and transportation services. The concept of a data center encompasses all the facilities, infrastructures, and components with the necessary levels of resilience and security required to provide the desired service availability. It should be noted that the term 'data center' as described herein is any suitable facility or volume of space where multiple computing devices can be stored including facilities such as server farms, server clusters, mainframes, and the like.

In recent years, data centers have experience steady growth both in number and size. These data centers require high availability and reliability for their daily operations, which in turn impacts the resources necessary for the operation. By applying well-defined metrics and analytics and making accurate measurements, it is possible to utilize data center infrastructure better and reduce the recurring cost of Information Technology (IT) and facility management.

Monitoring and data analysis are two fundamental elements of data center management. Monitoring tracks desired hardware and software metrics. The analysis evaluates these metrics to identify system or application states for troubleshooting, resource provisioning, or other management actions. Monitoring and the associated analytics can be performed in real-time, and/or in batched or in bulk intervals, and at a scale of tens of thousands of heterogenous nodes to effectively manage modern data centers.

Understanding and analyzing data center metrics allows the operators to better view possible inefficiencies by focusing on the core parameters. Metrics also allow architects and operators to measure the performance and effects of sub-system changes. Generally, metrics and analytics refer to the empirical, objective assignment of numbers, according to a rule derived from a model or theory to attributes of objects or events with the intent of describing them.

Limitations on data center management remain, however, as monitoring and analytics require copious data that can be tedious and complicated to retrieve. A primary step in developing a model to capture the effects of data center management is to decide which dimensions are relevant (e.g., what measurements are needed), define the metrics, and populate them. Tools, such as artificial intelligence for IT operations (AIOPS), can proactively monitor and provide alerts on all servers and support infrastructure in a data center. AIOPS can sometimes be required because of the scale and complexity of the infrastructure and the massive amount of data that is collected at any given time. As such, challenges exist in unifying the collected data in a meaningful and hierarchical way. For instance, when analyzing a server, an analysis is performed on multiple layers (e.g., operating system (OS), virtual, hardware, application) relating to that server, which also requires an analysis of all supporting servers and devices relating to that server. This can result in an analysis of all routers, switches, various layers of storage, databases, and other layers associated with the initial server.

Various techniques to gather data and conduct performance analytics, such as using structured query language (SQL) statements, requires writing across bulky data sets and meaningfully connecting that data with additional SQL statements to retrieve the pertinent data for the analysis. No singular script can marshal the data into a single, meaningful unit, and the code written is often use-case dependent. SQL joins also fail because the code can become significantly complex. Any new additions or changes to the code may require intimate knowledge of the original script. Additionally, there are costs associated with each query when dealing with big data repositories, which can result in a significant expense when querying all the datasets in a computationally intensive manner, as would be the case.

Other techniques, such as programmatically unifying the data, also have limitations. For instance, the limitations tend to revolve around organization and computational cost. The typical approach to handling this type of data is object-oriented programming (OOP), similar to object relation mapping (ORM). In OOP implementations, each logical object is created as either an instance of a class or a collection of interconnected class instances. A hierarchy of classes is classified by a system of criteria known as taxonomy. Problems arise with this form of classification, as each level of the hierarchy can only classify an object according to one particular set of criteria. For example, if an organism is classified according to its genetic traits, the color of the organism is not considered in any manner. If classification by color is required, a completely new tree structure would have to be created.

These types of hierarchical classification limitations are commonly seen in OOP. A single class hierarchy structure often tries to integrate multiple separate classification criteria into itself or make room for new types of classes, which were not predictable when the class hierarchy was originally designed. Multiple inheritances are often used as a work around solution to this problem. However, this kind of hierarchy can very quickly become laborious to maintain and expand, as issues like determining which copy of the base class will be used.

While this technique can accomplish retrieval of the pertinent data, the process can result in code with complicated hierarchies making software development difficult and the resulting code susceptible to error. Additionally, OOP stores the data in various places in memory, making computation on a large scale very slow as the number of objects and data scale upward.

Additionally, objects in OOP utilize a mechanism known as a virtual method table. Virtual method tables (i.e., virtual function table, virtual call table, dispatch table, vtable, vftable) are mechanisms used in a programming language to support dynamic dispatch or run-time method binding. Whenever a class, or object, defines a virtual function, a compiler adds a point to the virtual method table. These pointers can be used at runtime to invoke the appropriate function implementations. Thus, the attributes of an object can be split over various memory locations and connected via the virtual method table. Accessing these attributes requires usage of the virtual method table pointers. Using this mechanism oftentimes results in increased latency and increase I/O due to the attributes being stored in separate locations as well as the use of pointers to access those attributes.

As such, unifying many datasets, which in many cases can individually be considered large data sets, requires either brute-force writing of numerous SQL joins or attempting to programmatically link all the data in a meaningful way using OOP. This is because data center datasets can range from infrastructure logs, telemetry metrics, OS metrics, hardware metrics, middle-ware software metrics, application metrics, network metrics, configuration data, event data, and the like. Additionally, these datasets are mostly time-series based, which raises the complexity of unifying this data a significant amount.

As an example, when attempting to unify big datasets, the following requires unification: the target server/infrastructure device that is being monitored, the servers/infrastructure devices/software/hardware that directly supports the operation of the target server (i.e., first order affection), and the servers/infrastructure devices/software/hardware that indirectly supports the target server (i.e., second order affection), and across time. When analyzing and monitoring a data center's worth of data, issues arise from the variety of datasets, the time-series nature of the data, the complex relationships and mappings, and the large scope of the overall data center infrastructure (e.g., tens of thousands of servers and hundreds of thousands of supporting infrastructure hardware and software).

Embodiments of the present disclosure may overcome the above, and other problems, by providing a monitoring and analysis system operating a data engine that uses an ECS architecture for simulating data center/IT infrastructure for near real-time monitoring and analytics. Entity-Component-System (ECS) is a software architectural pattern that follows a composition over inheritance principle. This design pattern decouples objects into separated data and logic. This is achieved by separating the objects into three elements: Entities, Components, and Systems. In this approach, the small, reusable, and generic components define the properties of entities. The components do not contain any logic within themselves. Instead, the logic is handled by distinct systems that are matched against the components, and continuously perform their internal methods on them in the background. By separating data from logic, ECS achieves a modular system while avoiding pitfalls of Object-Oriented Programming (OOP), such as ambiguity in multiple inheritances.

The ECS architecture includes entities that are defined by devices being monitored. These devices include, but are not limited to, servers, cluster servers, individual devices, routers, switches, storage components, virtualized components, and any component relevant to data analysis and monitoring of a data center infrastructure. The data engine also includes components for each defined entity. These components are the entity's attributes used in data analysis and monitoring.

Additionally, the data engine also includes systems defined by the type of monitoring and/or analysis conducted in a data center. The systems can also have the types of components required to perform such an analysis. During the execution of the data engine, the systems can continuously monitor the entities with corresponding components the systems need for conducting their monitoring and/or analysis logic, respectively.

ECS architectures separate data and logic from each other. In this approach, all data of the objects are decoupled into components and can be processed as separate chunks between multiple entities at the same time instead of accessing a single object's data at once. This is at least partially due to the fact that in some embodiments, components of a given entity are stored as contiguous bits in an array, thereby making access more efficient with reduced I/O, relative to OOP. This allows for highly optimizable memory management, parallelization, and easy-to-manage class hierarchies. This software development architectural pattern follows composition over inheritance principle, allowing for flexible and dynamic management of entities in a large-scale real-time application.

An ECS architecture deviates from OOP by implementing entities as numerical integer identifiers rather than objects. The entities serve to unify components into a single being. The components in these architectures are logicless representations of an entity's properties and data. The logic is handled by separate systems, which can constantly loop through the data held by the components to lookout for changes in the data that are marked for monitoring. The data engine, or context manager, keeps a record of which components belong to which entities and can be used to pass the required properties to their respective systems.

Since components hold data, they have no dependencies. Each system can register the components required for a particular system to operate on it. For example, a provisioning system may register components relating to operating system metrics, server metrics, hardware metrics, and the like. The system can then check each entity for those components. If the entity has the corresponding components, then the system will perform its logic on that entity (e.g., perform provisioning analysis on the entity). If not, the entity is skipped, and no complex dependency trees are needed.

In embodiments consistent with the present disclosure, a data engine using an ECS architecture maps systems, entities, and components to devices, metrics, and analytics of a data center infrastructure to create a digital replication of the data center infrastructure. In this way, the analysis is driven by changes to the components (i.e., metrics within the data center that are captured and analyzed). When a metric within the data center is captured, a corresponding component for that metric is updated. As the data engine operates, systems will continuously monitor their registered components. When an event occurs based on the logic provided by the system, an action can occur. For example, entities, components, and systems can be created for the optimization of virtualized containers operating within a data center infrastructure. An entity can correspond to a virtualized container. The components can correspond to various metrics relating to the virtualized container, including OS metrics, server metrics, and related hardware metrics (e.g., routers, and switches). Logic can be provided to a system that can monitor these metrics to make a determination on the resources provisioned to the virtualized containers. As metrics are captured during the operation of the virtualized containers, the system can perform its logic and determine whether an entity (i.e., the virtualized container) requires a reduction or increase in resources based on the application it is executing.

In some embodiments, when the ECS architecture is initialized, pertinent data metrics collected in the data center are defined as components within the ECS architecture. These data metrics include infrastructure logs, telemetry metrics, OS metrics, hardware metrics, middle-ware software metrics, application metrics, network metrics, configuration data, event data, and the like. Additionally, entities created based on devices within the data center are defined by the associated components. For instance, a server located within the data center can be defined as an entity. The characteristics, such as OS, hardware, and networking metrics of the server, can correspond to defined components. Those components can be associated, via a context manager, with the entity thereby defining it as the server. Systems can be generated for performing data analytics on the entity for events occurring to a corresponding device on the data center.

In some embodiments, the ECS architecture is used to generate a ECS replicated version (i.e., a digital twin) of a data center. For instance, entities, components, and systems can be created that mimic the capabilities of the data center. The entities can correspond to each device, the components can correspond to the data metrics relating to each device, and the systems can provide logic relating to the operational functionality of the devices. Once the replicated data center is generated, a specified entity is removed. For instance, an entity relating to an application server can be removed. This can simulate a real-life occurrence of a hardware failure occurring on the data center. Once removed, systems can evaluate the effects in the replicated data center as a result of removing the specified entity. These mechanisms can be used to create remedial actions and measures in the event that such an occurrence does occur.

In some embodiments, the actions taken by the systems to remedy an event correspond to notifying other systems that an event has occurred. In order to notify the other systems, the system can create another component associated with the entity. The system can populate the new component with data indicating that the event has occurred. For example, a system containing logic to determine whether a container operating within the data center is overprovisioned can analyze an entity associated with the container. Upon determining the entity (i.e., the container) is overprovisioned, the system can create a new component as an indicator. As the data engine, through the systems, continuously cycle through the components, the newly created component acts as a notification to the second system of the event. During the iterative looping process, the second engine detects the newly created component and can perform remedial actions (e.g., reallocating resources to the container).

II. Example Data Center Environment

Referring now to FIG. 1, a block diagram of an example data center environment 100 suitable for use in implementing embodiments of the disclosure is shown. Generally, the data center environment 100 is suitable for providing computing services and resources such as remote storage, processing, and/or distribution of large amounts of data. The data center environment includes a data center 110, a server 120A, 120B, 120N (which may be referred herein singularly as "server 120" or collectively as "servers 120") where N is a variable integer representing any number of possible servers 120, a load balancer 130, a router 140, a gateway 150, a communications network 160, users 170A, 170B, computing devices 175A, 175B, and a monitoring and analysis system 190.

The example data center environment 100 configured for transmitting and providing data will now be described in detail. In particular, FIG. 1 illustrates an example computing environment in which embodiments described herein may be implemented. FIG. 1 is a diagram schematically illustrating an example of the data center 110 that can provide computing resources to users 170A and 170B via user computers 175A and 175B via the communications network 160. The data center 110 may be configured to provide computing resources for executing applications on a permanent or an as-needed basis.

The computer resources provided by the data center 110 may include various types of resources, such as gateway resources, load balance resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances or virtualized containers that may be configured to provide various web services.

In addition, combinations of resources may be made available via the communications network 160 and may be configured as one or more web services. The instances may be configured to execute applications, including web services, such as application services, media services, database services, processing services, gateway services, storage services, routing services, security services, encryption services, load balancing services, and the like.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communication protocols include, for example, hypertext protocol (HTTP), or non-HTTP protocols. These communication protocols may also include, for example, more reliable transport layer protocols, such as transmission control protocol (TCP), and less reliable transport layer protocols, such as user datagram protocol (UDP). Data storage resources may include file storage devices, block storage devices, storage array networks (SAN), and the like.

Each computing resource configuration may be available in different sizes, such as large resources consisting of many processors, large amounts of memory, and/or large storage capacity. Additionally, each type of configuration can also include small resources consisting of few processors, a smaller amount of memory and/or smaller storage capacity. For example, customers can allocate several small processing resources as web servers and/or one significant processing resource as a database server.

The servers 120 are components of the data center 110 configured to provide computing resources. These resources may be available as bare metal resources or as virtual machine instances 122A-F (which may be referred to herein singularly as "virtual machine instance 122" or collectively as "virtual machine instances 122").

The servers 120 shown in FIG. 1 may be servers configured appropriately for providing the computing resources described above and may provide the computing resources for executing one or more web services and/or applications. In some embodiments, the computer resources include the virtual machine instances 122. In the example of virtual machine instances, each of the servers 120 may be configured to execute an instance manager 128A, 128B, 128N (which may be referred here singularly as "instance manager 128" or collectively as "instance managers 128") where N is a variable integer representing any number of possible instance managers 128 corresponding to the number of servers 122 capable of executing the virtual machine instances 122. For example, the instance managers 128 may be virtual machine monitors (VMM) or another program configured to enable the executing of virtual machine instances 122 on the server 120.

The virtual machine instances 122 are components of the servers 120 configured as virtual emulations of a computing system's functionality through virtualization technology. The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. The virtual machine instance 122 can be a software emulation of a particular physical computing system that acts as a distinct logical computing system. Such a virtual machine instance 122 isolates multiple operating systems sharing a given physical computing resource. Furthermore, some virtualization technologies may provide virtual resources spanning one or more physical resources, such as a single virtual machine instance 122 with multiple virtual processors spanning various distinct and physical computing systems.

It should be appreciated that although the embodiments disclosed above to discuss the content of virtual machine instances, other types of implementations can be utilized with the concepts and technologies disclosed herein. For example, embodiments disclosed herein might also be utilized with computing systems that do not utilize virtual machine instances, or with computing systems that utilize cloud-based computing technologies (e.g., containerization).

The devices of the data center environment 100 are communicatively coupled via the communications network 160. In some embodiments, the communications network 160 includes one or more local area networks (LANs), wide area networks (WANs), and/or other networks. The communication path provided by the communications network 160 can be point-to-point over public and/or private networks. The communication can occur over a variety of networks, including private networks, VPN, MPLS circuit, or the Internet. The communications network 160 can use appropriate application programming interfaces (APIs) and data interchange formats such as Representational State Transfer (REST), JavaScript Object Notation (JSON), Extensible Markup Language (XML), Simple Object Access Protocol (SOAP), Java Message Service (JMS), and/or Java Platform Module System.

In some embodiments, communication is encrypted. The transmission is generally over a network such as the LAN, WAN, telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, W-Fi and WiMAX.

The communications network 160 may, for example, be a publicly accessible network of linked networks and possibly operated by various distinct parties, such as the Internet. In some embodiments, the communications network 160 is a private network, such as a corporate or university network, that is wholly or partially inaccessible to non-privileged users. In some embodiments, the communications network 160 includes one or more private networks with access to and/or from the Internet.

The communications network 160 is further configured to provide access to the user computers 175A, 175B (which may be referred to herein singularly as "user computer 128" or collectively as "user computers 128"). The user computers 175 may be computers utilized by users 170A, 170B or other customers of the data center 110. For example, the user computer 175A or 175B may be a server, a desktop, or a laptop personal computer, a tablet computer, a wireless telephone, a personal digital assistant (PDA), an e-book reader, a game console, a set-top box, or any other computing device capable of accessing data center 110. The user computer 175A or 175B may connect directly to the Internet (e.g., via a cable modem, Digital Subscriber Line (DSL), or fiber optic modem. It should be noted that although only two user computers 175A and 175B are depicted, it should be appreciated that there may be multiple user computers. The user computers 175A, 175B may also be utilized to configure aspects of the computing resources provided by the data center 110. In this regard, the data center 110 might provide a gateway or web interface through which aspects of its operation may be configured using a web browser application program executing on the user computer 175. Alternately, a stand-alone application program executing on the user computer 175 might access an application programming interface (API) exposed by the data center 110 for performing the configuration operations. Other mechanisms for configuring the operation of various web services available at the data center 110 might also be utilized.

As illustrated in FIG. 1, the data center 110 includes a router 140 that is utilized to interconnect the servers 120A, 120B, and 120N. The router 140 is also connected to the gateway 150, which is connected to the communications network 160. The router 140 can be connected to one or more load balancers and alone or in combination can manage communications within networks in the data center 110. For example, the data center 110 can forward packets or other data communications as appropriate based on characteristics of such communications (e.g., header information including source and/or destination addresses, protocol identifiers, size, processing requirements, etc.) and/or the characteristics of the private network (e.g., routes based on network topology, etc.) It should be appreciated that, for the sake of simplicity, various aspects of the computing systems and other devices of this example are illustrated without showing certain conventional details. Additional computing systems and other devices may be interconnected in other embodiments and may be interconnected in different ways without deviating from the embodiments described herein.

As also shown in FIG. 1, the data center 110 includes a load balancer 130 employed to at least direct various communication to, from, and/or, between the servers 120A, 120B and 120N. While FIG. 1 depicts the router 140 positioned between the gateway 150 and load balancer 130, this is merely an exemplary configuration. In some instances, the load balancer 130 may be positioned between the gateway 140 and the router 150. In some instances, the load balancer 130 can examine portions of incoming communications from the user computers 175A, 175B to determine or more appropriate servers 120 to receive and/or process the incoming communications. The load balancer 130 can determine appropriate servers to receive and/or process the incoming communications based on factors such as an identity, location, or other attributes associated with the user computers 175A, 175B, a nature of a task with the communications are associated, a priority of a task with which the communications are associated, a duration of a task with which the communications are associated, a size and/or estimated resource usage of a task with which the communications are associated and many other factors. The load balancer 130 may, for example, collect or otherwise have access to state information and other information associated with various tasks to, for example, assist in managing communications and other operations related to such tasks.

The data center 110 also includes a monitoring and analysis system 190 configured to monitor the operation of the data center 110 by processing one or more data logs stored by applications running on the data center 110 and capturing data metrics in real-time or near real-time. The monitoring and analysis system 190 is further configured to analyze those metrics and logs provided by the data center 110 to monitor for events and/or perform actions resulting from the metrics. The monitoring and analysis system 190 can implement an ECS architecture to perform the monitoring and analysis functionalities. In some embodiments, the monitoring and analysis system 190 may be located external to, or as part of, a particular data center and may be configured to monitor one or more performance characteristics of the devices, such as processing power, communications throughput, system errors, and the like.

In some embodiments, the monitoring and analysis system 190 may be configured to monitor the data center 110 as a whole and/or each component/device (e.g., the servers 120, one or more data repositories, and the like) of the data center 110 individually. The monitoring and analysis system 190 can store one or more criteria to set performance thresholds to gauge performance of the data center. For example, a threshold may be set to specify that no more than a specified level (e.g., 80%, 85%, 90%, etc.) of the processing power of each server 120 of the data center 110 be used over a specified time period. In some instances, a threshold may be set to specify that no single application is to utilize no more than a specified level (e.g., 30%, 35%, 50%, etc.) of each of the server's processing power. Other thresholds may include a maximum message frequency (e.g., messages per time period, etc.), a maximum data repository size, a maximum memory usage, over/under provisioning of containers, virtual machine utilization, and the like. The monitoring and analysis system 190 is described in more detail in FIG. 2 below.

In some embodiments, the servers 120 of the data center 110 are adapted to provide a particular functionality (e.g., consumer account management, a web-based product sales system, and the like). The data center 110 may be distributed in one or more geographic locations to allow for shared computing resources, particularly in applications that require large bandwidth and/or processing power to provide a particular service to a large number of individuals. For example, an illustrative data center can be configured to provide consumer access to an account, such as a financial account held by an individual at a financial institution. In some cases, the data center 110 comprises one or more data centers associated with this functionality and can be located in one or more geographic locations.

In some embodiments, the data center 110 provides a "cloud computing model" to provide convenient, on-demand network access to a shared pool of configurable computing resources (e.g., network servers, storage, applications, and services). The shared pool of configurable computing resources may be rapidly provisioned via virtualization, released with low management effort or service provider interaction, and then scaled accordingly. A cloud computing model can be composed of various characteristics (e.g., on-demand self-service, broad network access, resource pooling, rapid elasticity, measured service, and the like), service models (e.g., Software as a Service ("SaaS"), Platform as a Service ("PaaS"), Infrastructure as a Service ("IaaS"), and deployment model (e.g., private cloud, hybrid cloud, public cloud, community cloud, and the like). An environment that implements the cloud computing model is typically referred to as a cloud computing environment. In some cases, such configurability can cause inadvertent problems when implementing a configuration designed based on different hardware and/or software configurations.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that the data center environment 100 described in FIG. 1 is merely illustrative and that other implementations might be utilized. It should also be appreciated that a server, gateway, or other computing device may comprise any combination of hardware or software that can interact and perform the described types of functionality, including without limitation: desktop or other computers, database servers, network storage devices, and other network devices, PDAs, tablets, cellphones, wireless phones, pagers, electronic organizers, Internet appliances, television-based systems, and various other consumer products that include appropriate communication capabilities.

Figure 2:
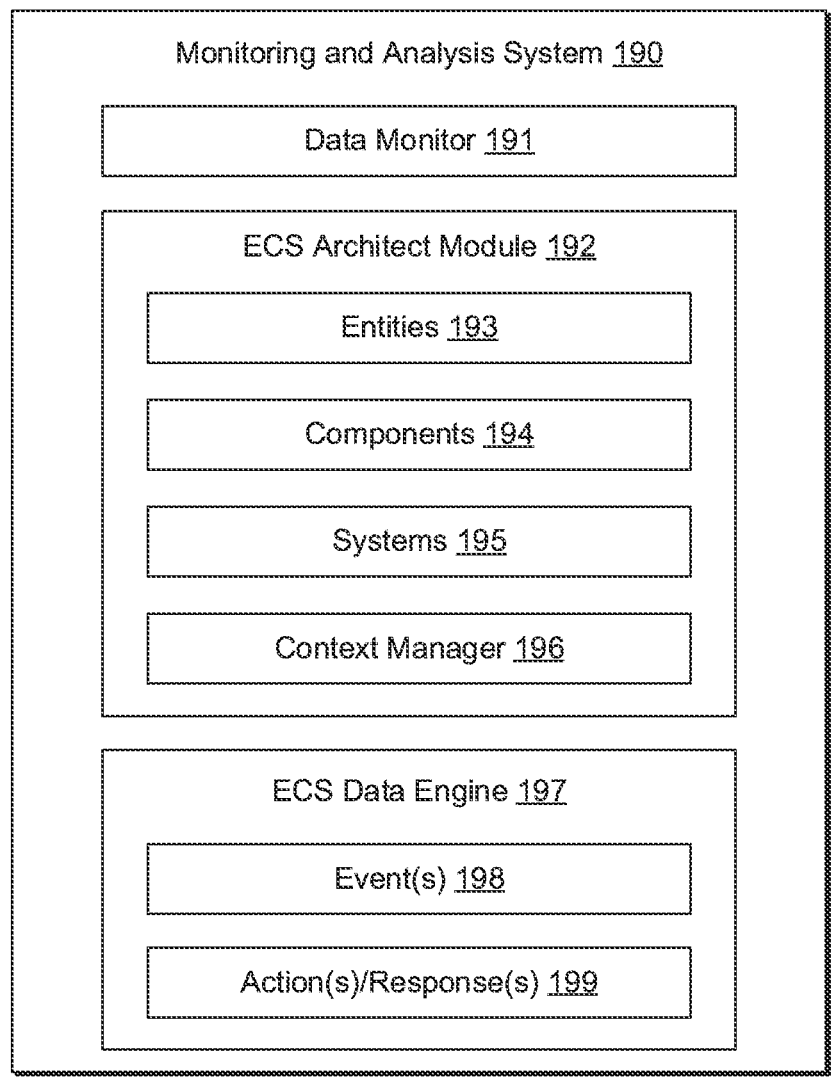
FIG. 2 is a block diagram of an example monitoring and analysis system in accordance with embodiments of the present disclosure.

Referring now to FIG. 2, the monitoring and analysis system 190 is a component of the data center environment 100 configured to provide monitoring and analysis functionalities for the data center 110 using an ECS architecture. The monitoring and analysis system 190 includes a data monitor 191, an ECS architect module 192, and an ECS data engine 197.

The data monitor 191 is a component of the monitoring and analysis system 190 configured to perform data monitoring on the data center 110. The data monitoring can be a continuous process (e.g., near real-time) and/or performed at specified intervals (e.g., each minute, each hour, daily, weekly, etc.). The data monitor 191 is further configured to monitor the performance characteristics of the devices associated with the data center 110. These characteristics include, but are not limited to, processing power, communications throughput, system errors, and the like. In some embodiments, the data monitor 191 is configured to monitor the data center 110 as a whole and/or each component (e.g., the servers 120, the load balancer 130, the router 140, the gateway 150, the communications network 160, and the like) of the data center 110 individually.

In some embodiments, the data monitor 191 includes a single application configured to monitor a plurality of input sources and/or characteristics/metrics. In some cases, the data monitor 191 includes a plurality of data monitor applications, each of which may be configured to monitor a particular data metric source (e.g., input source, hardware, software) and/or a particular application including a particular device or input source, such as a server monitor, a router monitor, network monitor, email data monitor, message data monitor, web interaction data monitor, and the like. These applications can also monitor for device upgrades and/or new versions of hardware, software, and firmware installed on the data center 110. The data monitor 191 can collect data metrics of these device upgrades, including hardware vendor, software versions, patches, firmware versions, known bug fixes, and the like.

The ECS architect module 192 is a component of the monitoring and analysis system 190 configured to build an ECS architecture model around the data center 110. The ECS architecture includes entity 193 instances reduced from objects in an OOP model to numerical integer identifiers, unifying components 194 into a defined object. The components 194 can be considered a logicless representation of an entity's properties and data. For example, the server 122A in the data center can be considered an entity. The characteristics and data associated with the server 122A can be considered components 194. The components 194 may include hardware metrics such as processing metrics, hard drive metrics, memory metrics, network metrics, as well as OS-level metrics that can identify the type and performance of the OS operating on the server 122A. As such, each entity 193 can represent a specific concept (e.g., device, component, connection, hardware component, virtual component) relating to the data center 110. In some embodiments, the ECS architect module 192 utilizes a listing of the various devices, components, and data metrics associated with the data center 110. From that listing, pertinent components 194 and entities 193 can be generated.

The components 194 are information and data metrics relating to the data center 110. Each component 194 can represent a different aspect of an entity 193 by providing it the data required to possess that particular aspect. For instance, a server entity can include an OS component identifying the type of OS operating on the server. The data metrics include, but are not limited to, hardware information (e.g., vendor information, model information, component version information, driver information, and the like), software information (e.g., vendor information, version information, service pack information, a list of installed software, and the like, data center configuration information (e.g., server types installed, number of servers, OS information for each server, and the like), server configuration information (e.g., driver information, configuration settings information, hardware version information, hardware BIOS information, and the like), a time, a geographic location id, a data center id, and the like.

Additionally, the ECS architect module is further configured to generate systems 195 for performing data analysis functionalities relating to the data center 110. The systems 195 contain the logic for the components that perform data analysis functionalities. During operation, systems 195 can continuously perform internal methods on the active components 194 associated with the systems. The associated components are matched against a set of components the system utilizes when performing its logic. When a data value is changed to a component 194, the systems can perform their data analysis to determine if an event has occurred.

The data analysis techniques performed by the systems 195 can be used to measure, monitor, assess performance, health, productivity, issues, outages, or perform actions or any other type of data analytic capable of being performed on the data stored by the components 194 of the data center 110.

The systems 195 may store one or more criteria or set performance thresholds to gauge the performance of the data center 110 and/or as a way to determine if an event has occurred. For example, a threshold may be set to specify that no more than a specified level (e.g., 85%, 90%, 95%, etc.) of the processing power of the servers 120 on the data center 110 can be used over a specified time period. In some cases, a threshold may be set to specify that no single application is to utilize no more than a specified level (e.g., 30%, 35%, 40%, etc.) of each server's processing power. Other thresholds can include, for example, under-provisioning, over-provisioning, a maximum message frequency, a maximum data repository size, a maximum memory usage, and the like. The entities 193 with components 194 having exceeded a threshold or criteria can indicate that an event has occurred.

In addition to analyzing the components 194 for potential events, the systems 195 can include logic that performs remedial actions designed to remedy the event (e.g., reallocation of resources, diverting network traffic, creating an alert, notifying administrators, etc.). In some cases, when an event has been detected (e.g., a threshold has been exceeded), logic can be included in the systems 196 to perform an action such as an alert that notifies other systems 196 operating within the monitoring and analysis system 190. In some embodiments, a system 196 creates an additional component for entities 193 with components with an event. For instance, the system 196 performing the analysis detects those components 194 of an entity 193 exceeded a performance threshold. The system 196 can then create a new component 194 and assign it to the entity 193. Additionally, the system 196 can populate the new component 194 with data that indicates the event has occurred. As such, the new component 194 can act as a type of alert, indicator, flag, and the like.

In response to an event, a message may be generated and sent via the communications network 160 to an administrator or a log can be created indicating an event has occurred. The message/log can be used to generate a record associated with the event, where the data record includes an event description (e.g., the type of data analysis performed). This information can be stored in one or more components 193 relating to the entity 193 associated with the event.

In some embodiments, systems 195 are created that monitor for alerts created by other systems (e.g., creating a component that flags an entity) regarding the performance of one or more of the entities 193 (e.g., devices within the data center 110). For example, an alert may be generated when certain criteria (e.g., a system load threshold, a process load threshold, a message throughput threshold, and the like) are detected by another system 195. In such cases, the systems 195 configured to detect such alerts can include logic that provides a solution to the alert (e.g., reprovisioning, restart of a server, retransmission of information, reallocation of resources, and the like). The systems 195 can automatically transmit the solution (e.g., the steps required to perform the solution) to the data center 110 that can then be performed. The results of each of the solution steps may be monitored by either the same system 195 or subsequent systems 195 specifically designed for those use cases to determine whether the solution has been successful.

In some embodiments, the ECS architect module 192 is configured to create a replicated data center (e.g., a digital twin) of the data center 110. The ECS architect module 192 can map systems, entities, and components to devices, metrics, and analytics of a data center infrastructure to create a digital replication of the data center infrastructure. In this way, the analysis is driven by changes to the components (i.e., metrics within the data center that are captured and analyzed). When a metric within the data center 110 is captured, a corresponding component for that metric is updated. As the ECS data engine 197 operates, systems will continuously monitor their registered components. When an event 197 occurs based on the logic provided by the system, an action 199 can occur. For example, entities, components, and systems can be created for the optimization of virtualized containers operating within a data center infrastructure. An entity can correspond to a virtualized container. The components can correspond to various metrics relating to the virtualized container, including OS metrics, server metrics, and related hardware metrics (e.g., routers, and switches). Logic can be provided to a system that can monitor these metrics to make a determination on the resources provisioned to the virtualized containers. As metrics are captured during the operation of the virtualized containers, the system can perform its logic and determine whether an entity (i.e., the virtualized container) requires a reduction or increase in resources based on the application that it is executing.

During runtime, the ECS data engine 197 continuously operates all the systems 195 created by the ECS architect module 192 to perform their internal methods. The data monitor 191 continuously updates the components 194 with collected data metrics, and the state of the entities 193 are analyzed by the systems 195 to determine if an event 198 has occurred corresponding requiring a remedial action 199 to occur. As described above, the events 198 corresponds to events 198 occurring in the data center 110 as they relate to the devices associated with the entities 193. The actions 199 corresponds to steps that are taken to rectify the event.

It is noted that FIG. 2 is intended to depict the major representative components of an exemplary monitoring and analysis system 190. In some embodiments, however, individual components may have greater or lesser complexity than as represented in FIG. 2, components other than or in addition to those shown in FIG. 2 may be present, and the number, type, and configuration of such components may vary.

Thus, the illustrative embodiments provide various improvements over conventional techniques. For example, embodiments that provide an ECS architecture provide more efficient techniques for monitoring and analyzing data relating to a data center because complicated use case scripts (e.g., SQL) do not need to be written and inherency is not necessary as entities are defined by the components and not based on a class hierarchy. In embodiments supporting event detection and remedial actions provide more efficient mechanisms for rectifying issues that arise in a data center as systems continuously operate and can include logic that rectifies issues as they occur. Additionally, systems can be created and deployed within the ECS architecture during operation to expand the system's capabilities and monitor issues that may arise.

III. Example Flow Diagram

Figure 3:
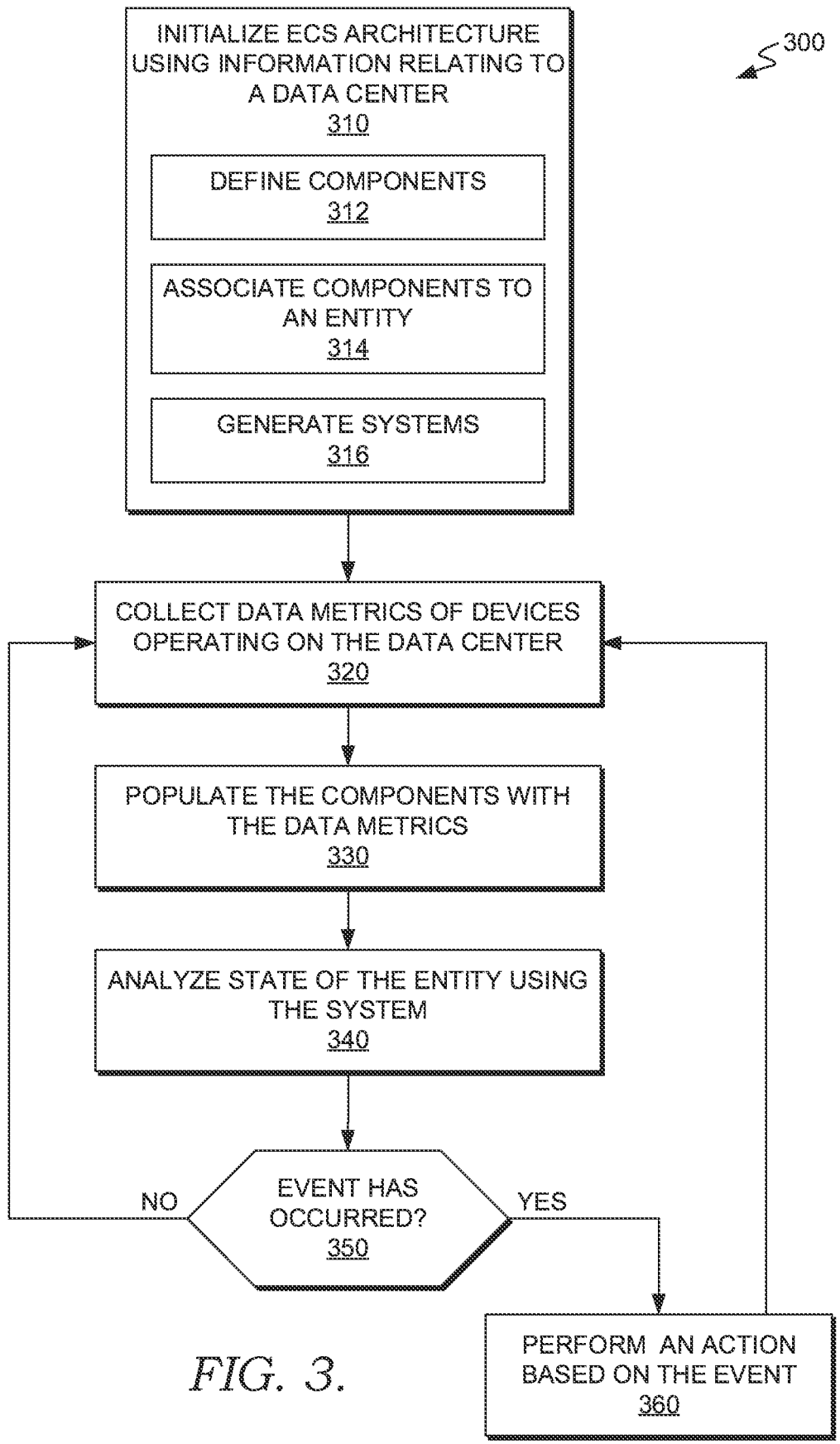
FIG. 3 is a flow diagram of an example process for monitoring and analysis of a data center using an ECS architecture using real-time data in accordance with embodiments of the present disclosure.

FIG. 3 is a flow diagram of an example process 300 providing data monitoring and analysis of a data center using an ECS architecture, in accordance with embodiments of the present disclosure. The process 300 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 and FIG. 2). The computer-implemented method, the system (that includes at least one computing device having at least one processor and at least one computer readable storage medium), and/or the computer readable medium as described herein may perform or be caused to perform the process 300 or any other functionality described herein.

The monitoring and analysis system 190 initializes an ECS architecture using information gathered from the data center 110. This is illustrated at step 310. During initialization, pertinent data metrics collected in the data center 110 are defined as components within the ECS architectures. These data metrics include infrastructure logs, telemetry metrics, OS metrics, hardware metrics, middle-ware software metrics, application metrics, network metrics, configuration data, event data, and the like. Additionally, entities are also created based on devices within the data center 110 and defined by the components they are associated with. The entities can be represented as logicless integers and are defined by their associated components. For instance, a server located within the data center 110 can be defined as an entity. The entity itself can simply be a place holder the context manager 199. Characteristics such as OS metrics, hardware metrics, and networking metrics of the server can correspond to defined components of the entity. The association between the entity and the components can occur via a context manager 199, with the entity being defined by components associated with the server. Systems can be generated for performing data analytics on the entity for events occurring to a corresponding device on the data center (e.g., a server, a router, storage device, containers, virtual machines, etc.).

The data monitor 191, via a communication network, collects data metrics generated in-real time from the data center 110. This is illustrated at step 320. The data monitor 191 can monitor the performance characteristics of the devices associated with the data center 110. These characteristics include, but are not limited to, processing power, communications throughput, system errors, and the like. In some embodiments, the data monitor 191 is configured to monitor the data center 110 as a whole and/or each component (e.g., the servers 120, the load balancer 130, the router 140, the gateway 150, the communications network 160, and the like) of the data center 110 individually.

Once collected, the data monitor 191 populates the components 194 defined by the ECS architect module 190 with their corresponding data metric. This is illustrated at step 330. The defined components 194 can correspond to data metrics including, but not limited to, hardware information, software information, data center configuration information, server configuration information a time, a geographic location id, a data center id, and the like.

The systems continuously, or on a predefined interval, perform an analysis on the data metrics directly stored by the components to determine state changes of the entities. This is illustrated at step 340. In some embodiments, the analysis techniques can analyze processing power, communications throughput, system errors, performance, health, productivity, issues, outages, or any other type of data analytic capable of being performed on the data stored by the components 194 of the data center 110.

In some embodiments, systems 195 store one or more criteria or set performance thresholds to gauge the performance of the data center 110 and/or as a way to determine if an event has occurred based on the analysis. For example, a threshold may be set to specify that no more than a specified level (e.g., 85%, 90%, 95%, etc.) of the processing power of the servers 120 on the data center 110 can be used over a specified time period. In some cases, a threshold may be set to specify that no single application is to utilize no more than a specified level (e.g., 30%, 35%, 40%, etc.) of each server's processing power. Other thresholds can include, for example, under-provisioning, over-provisioning, a maximum message frequency, a maximum data repository size, a maximum memory usage, and the like. The entities 193 with components 194 having exceeded a threshold or criteria can indicate that an event has occurred.

A determination is made as to whether a state change of an entity 194 indicates an event. This is illustrated at step 350. The state change can be a determination made that a predefined threshold has been exceeded, or that some measurement has been reached during the analysis of an entity. If no event is detected, the ECS data engine 197 continues to its loop, and the process 300 returns to step 320 to collect and populate data metrics as they are collected. However, if an event has been detected, the process 300 proceeds to step 360.

The system performs a remedial action on the entity cause the state of the entity 193 to alter based on the event 198. This is illustrated at step 360. When an event 198 has been detected (e.g., a threshold has been exceeded), logic can be included in the systems 196 to perform an action such an alert that notifies other systems 196 operating within the monitoring and analysis system 190. In some embodiments, a system 196 creates an additional component for entities 193 with components with an event. For instance, the system 196 performing the analysis detects those components 194 of an entity 193 exceeded a performance threshold. The system 196 can then create a new component 194 and assign it to the entity 193. Additionally, the system 196 can populate the new component 194 with data that indicates the event has occurred. Upon performance of the action, and/or continuously, the ECS data engine 197 continues to its loop and the process 300 returns to step 320 to collect and populate data metrics as they are collected.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

IV. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

V. Example Computing Environment

Figure 4:
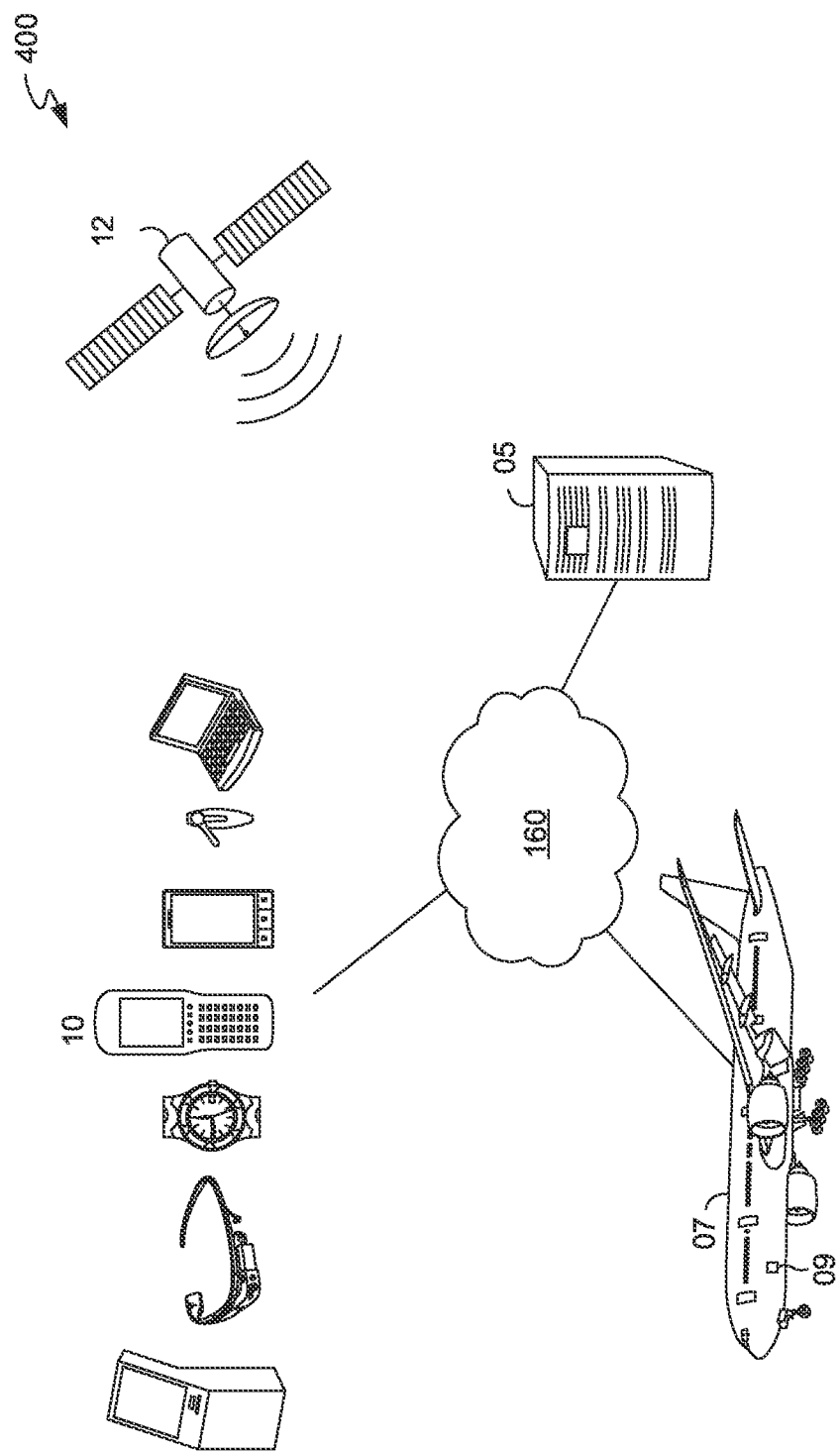
FIG. 4 is a schematic diagram of an example computing environment in which aspects of the present disclosure are employed in accordance with embodiments of the present disclosure.

FIG. 4 is a schematic diagram of an example computing environment 400 in which aspects of the present disclosure are employed in, according to some embodiments. As shown in FIG. 4, this particular environment 400 includes one or more aircraft 07, one or more analysis computing entities 05, one or more source computing entities 10, one or more satellites 12, a more communications network 160 (from FIG. 1), and/or the like. Each of these components, entities, devices, systems, and similar words used herein interchangeably may be in direct or indirect communication with, for example, one another over the same or different wired or wireless networks. Additionally, while FIG. 4 illustrates the various system entities as separate, standalone entities, the various embodiments are not limited to this particular architecture.

The analysis computing entity(s) 05 is generally responsible for data monitoring and analysis of a data center using an ECS architecture and initializing the ECS architecture by associating devices and data metrics relating to the data center as entities and components. During runtime, the components are continuously updated with collected data metrics and the state of the entities are analyzed by the systems to determine if an event has occurred corresponding requiring a remedial action to occur. The events correspond to events occurring on the data center as they relate to the devices associated with the entities. Actions correspond to steps that are taken to rectify the event. In some embodiments, the analysis computing entity(s) 05 includes one or more of the components of the data center environment 100, such as the data center 110, the servers 120, the load balancer 130, the router 140, the gateway 150, and the monitoring and analysis system 190 of FIG. 1 and FIG. 2.

The source computing entity(s) 10 (or user device) is generally responsible for presenting user interface elements in association with the information determined via the analysis computing entity(s) 05. For example, in response to the analysis computing entity(s) 05 determining that a value exceeds a cost variance threshold, the analysis computing entity(s) 05 instructs, over the network(S) 110, the source computing entity(s) 10 (e.g., a DIAD) to superimpose visual data, at a user interface, over the value. It is understood that in some embodiments, the source computing entity(s) 10 alternatively or additionally provide the data center environment 100 of FIG. 1 with information and/or utilizes services offered by the data center environment 100.

In various embodiments, the aircraft 07 includes one or more telematics sensor devices 09. The telematics sensor devices 09 sample various attributes of the aircraft 07, such as speed, location (e.g., via a GPS module), fuel consumption, and/or any other suitable type attributes of the vehicle 07 and transmit the data to the analysis computing entity 05 for analysis. In some embodiments, any of the historical flight data described herein, such as FPS data, is automatically derived via the telematics sensor devices 09. For example, in order to determine where a particular aircraft flew, how many miles were traversed, etc. a GPS or other module that acts as a telematics sensor device 09 may sample such data and store, in near-real-time, such data as a stream of values.

VI. Example Analysis Computing Entity

Figure 5:
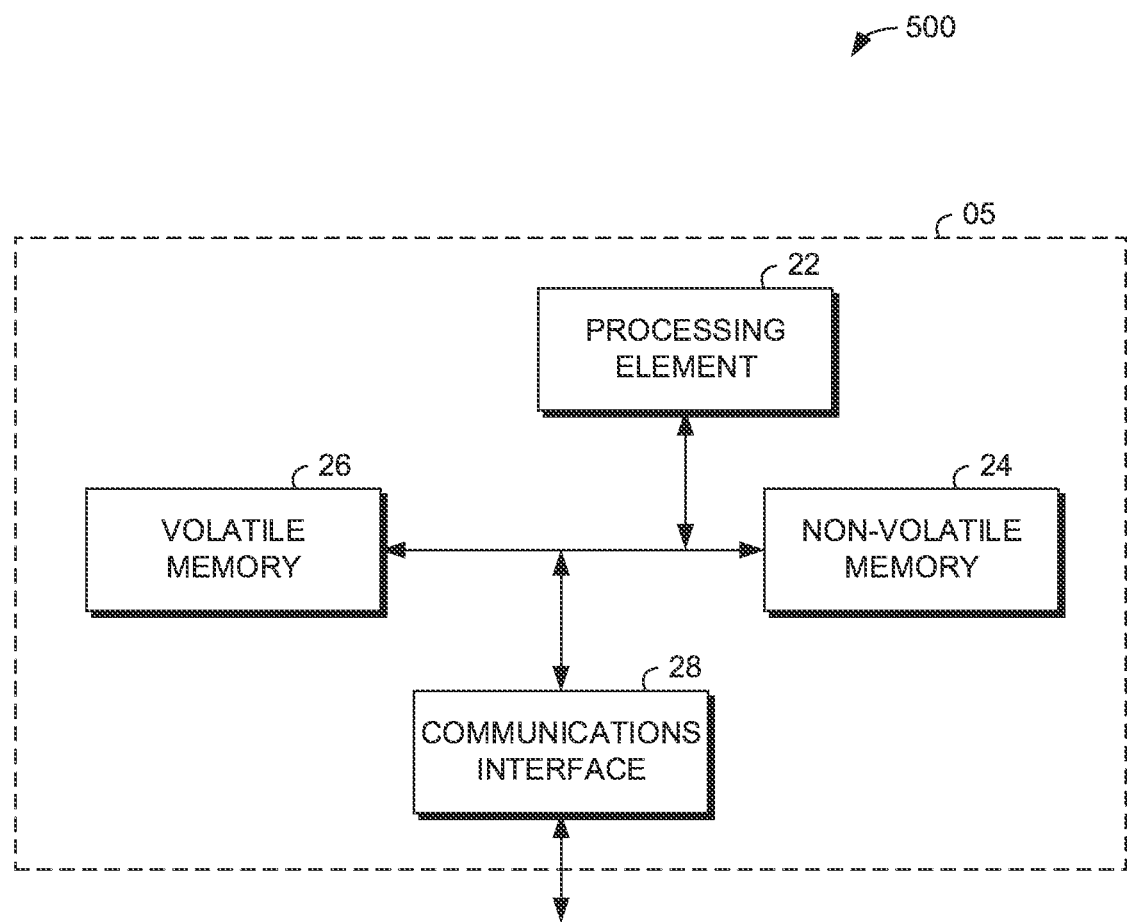
FIG. 5 is a block diagram of an analysis computing entity of FIG. 9 in accordance with embodiments of the present disclosure.

FIG. 5 is a block diagram of the analysis computing entity 05 of FIG. 4, according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 05 may also include one or more communications interfaces 24 for communicating with various computing entities, such as by communicating data, content, information/data, and/or similar terms used herein interchangeably that can be transmitted, received, operated on, processed, displayed, stored, and/or the like.

As shown in FIG. 5, in particular embodiments, the analysis computing entity 05 may include or be in communication with one or more processing elements 20 (also referred to as processors, processing circuitry, and/or similar terms used herein interchangeably) that communicate with other elements within the analysis computing entity 05 via a bus, for example. As will be understood, the processing element 20 may be embodied in a number of different ways. For example, the processing element 20 may be embodied as one or more complex programmable logic devices (CPLDs), microprocessors, multi-core processors, coprocessing entities, application-specific instruction-set processors (ASIPs), microcontrollers, and/or controllers. Further, the processing element 20 may be embodied as one or more other processing devices or circuitry. The term circuitry may refer to an entirely hardware embodiment or a combination of hardware and computer program products. Thus, the processing element 20 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 20 may be configured for a particular use or configured to execute instructions stored in volatile or non-volatile media or otherwise accessible to the processing element 20. As such, whether configured by hardware or computer program products, or by a combination thereof, the processing element 20 may be capable of performing steps or operations according to embodiments of the present disclosure when configured accordingly.

In particular embodiments, the analysis computing entity 05 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 22, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 05 may further include or be in communication with volatile media (also referred to as volatile storage, memory, memory storage, memory circuitry and/or similar terms used herein interchangeably). In particular embodiments, the volatile storage or memory may also include one or more volatile storage or memory media 26, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 20. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 20 and operating system.

As indicated, in particular embodiments, the analysis computing entity 05 may also include one or more communications interfaces 24 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 05 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 05 may include or be in communication with one or more input elements, such as a keyboard input, a mouse input, a touch screen/display input, motion input, movement input, audio input, pointing device input, joystick input, keypad input, and/or the like. The analysis computing entity 05 may also include or be in communication with one or more output elements (not shown), such as audio output, video output, screen/display output, motion output, movement output, and/or the like.

As will be appreciated, one or more of the analysis computing entity's 05 components may be located remotely from other analysis computing entity 05 components, such as in a distributed system. Furthermore, one or more of the components may be combined and additional components performing functions described herein may be included in the analysis computing entity 05. Thus, the analysis computing entity 05 can be adapted to accommodate a variety of needs and circumstances. As will be recognized, these architectures and descriptions are provided for exemplary purposes only and are not limiting to the various embodiments.

VII. Example Source Computing Entity

Figure 6:
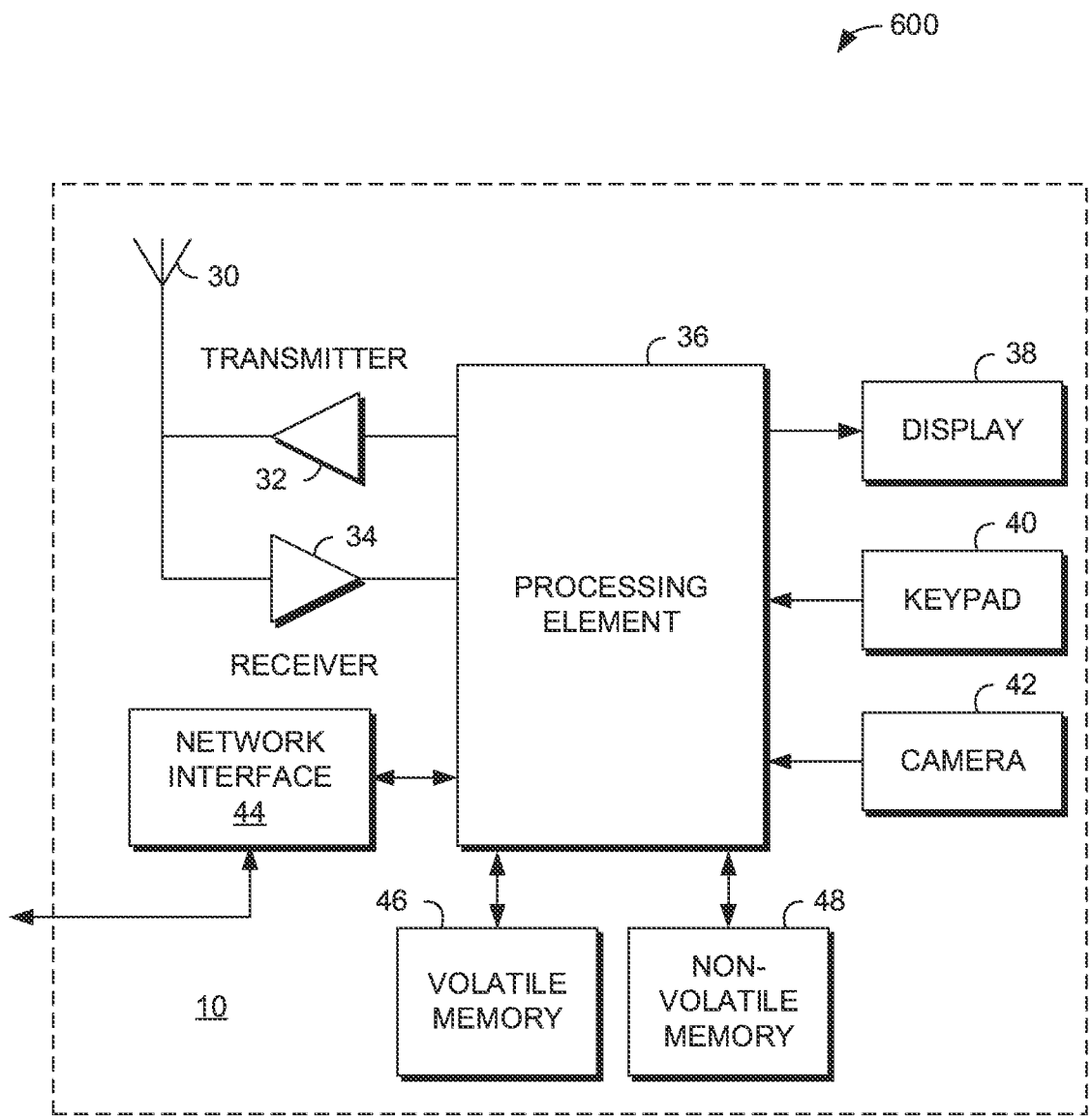
FIG. 6 is a block diagram of a source computing entity(s) of FIG. 9 in accordance with embodiments of the present disclosure.

Turning now to FIG. 6, a block diagram of a source computing entity of FIG. 4, according to some embodiments. In certain embodiments, source computing entity(s) 10 may be embodied as handheld computing entities, such as mobile phones, tablets, personal digital assistants, and/or the like, that may be operated at least in part based on user input received from a user via an input mechanism. Moreover, source computing entity(s) 10 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, source computing entity(s) 10 may be utilized as onboard controllers for UAVs configured for picking-up and/or delivering packages to various locations, and accordingly such source computing entity(s) 10 may be configured to monitor various inputs (e.g., from various sensors) and generated various outputs. It should be understood that various embodiments of the present disclosure may comprise a plurality of source computing entities 10 embodied in one or more forms (e.g., kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like-whether associated with a carrier. In particular embodiments, a user may operate a source computing entity 10 that may include one or more components that are functionally similar to those of the analysis computing entity 05. This figure provides an illustrative schematic representative of a source computing entity (s) 10 that can be used in conjunction with embodiments of the present disclosure. In general, the terms device, system, source computing entity, user device, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Source computing entity(s) 10 can be operated by various parties, including carrier personnel (sorters, loaders, delivery drivers, network administrators, and/or the like). As shown this figure, the source computing entity(s) 10 can include an antenna 30, a transmitter 32 (e.g., radio), a receiver 34 (e.g., radio), and a processing element 36 (e.g., CPLDs, microprocessors, multi-core processors, coprocessing entities, ASIPs, microcontrollers, and/or controllers) that provides signals to and receives signals from the transmitter 32 and receiver 34, respectively. In some embodiments, the source computing entity(s) 10 additionally includes other components not shown, such as a fingerprint reader, a printer, and/or the camera.

The signals provided to and received from the transmitter 32 and the receiver 34, respectively, may include signaling information in accordance with air interface standards of applicable wireless systems. In this regard, the source computing entity(s) 10 may be capable of operating with one or more air interface standards, communication protocols, modulation types, and access types. More particularly, the source computing entity(s) 10 may operate in accordance with any of a number of wireless communication standards and protocols, such as those described above with regard to the analysis computing entity(s) 05. In a particular embodiment, the source computing entity(s) 10 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the source computing entity(s) 10 may operate in accordance with multiple wired communication standards and protocols, such as those described above with regard to the analysis computing entity(s) 05 via a network interface 44.

Via these communication standards and protocols, the source computing entity(s) 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The source computing entity(s) 10 can also download changes, add-ons, and updates, for instance, to its firmware, software (e.g., including executable instructions, applications, program modules), and operating system.

According to particular embodiments, the source computing entity(s) 10 may include location determining aspects, devices, modules, functionalities, and/or similar words used herein interchangeably. For example, the source computing entity(s) 10 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 10 position in connection with a variety of other systems, including cellular towers, Wi-Fi access points, and/or the like. Similarly, the source computing entity(s) 10 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The source computing entity(s) 10 may also comprise a user interface (that can include a display 38 coupled to a processing element 36) and/or a user input interface (coupled to a processing element 36). For example, the user interface may be a user application, browser, user interface, and/or similar words used herein interchangeably executing on and/or accessible via the source computing entity 10 to interact with and/or cause display of information from the analysis computing entity 05, as described herein. The user input interface can comprise any of a number of devices or interfaces allowing the source computing entity(s) 10 to receive information/data, such as a keypad 40 (hard or soft), a touch display, voice/speech or motion interfaces, or other input device. In embodiments including a keypad 40, the keypad 40 can include (or cause display of) the conventional numeric (0-9) and related keys (#, *), and other keys used for operating the source computing entity(s) 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in this figure, the source computing entity(s) 10 may also include an camera 42, imaging device, and/or similar words used herein interchangeably (e.g., still-image camera, video camera, IoT enabled camera, IoT module with a low resolution camera, a wireless enabled MCU, and/or the like) configured to capture images. The source computing entity(s) 10 may be configured to capture images via the onboard camera 42, and to store those imaging devices/cameras locally, such as in the volatile memory 46 and/or non-volatile memory 48. As discussed herein, the source computing entity(s) 10 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 42. The contextual data may be stored as a portion of the image (such that a visual representation of the image data includes the contextual data) and/or may be stored as metadata associated with the image data that may be accessible to various computing entity(s) 10.

The source computing entity(s) 10 may include other input mechanisms, such as scanners (e.g., barcode scanners), microphones, accelerometers, RFID readers, and/or the like configured to capture and store various information types for the source computing entity(s) 10. For example, a scanner may be used to capture parcel/item/shipment information/data from an item indicator disposed on a surface of a shipment or other item. In certain embodiments, the source computing entity(s) 10 may be configured to associate any captured input information/data, for example, via the onboard processing element 36. For example, scan data captured via a scanner may be associated with image data captured via the camera 42 such that the scan data is provided as contextual data associated with the image data.

The source computing entity(s) 10 can also include volatile memory 46 and/or non-volatile storage or memory 48, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the source computing entity(s) 10. As indicated, this may include a user application that is resident on the entity or accessible through a browser or other user interface for communicating with the analysis computing entity 05 and/or various other computing entities.

In another embodiment, the source computing entity(s) 10 may include one or more components or functionality that are the same or similar to those of the analysis computing entity 05, as described in greater detail above. As will be recognized, these architectures and descriptions are provided for exemplary purposes only and are not limiting to the various embodiments.

The following embodiments represent exemplary embodiments of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. A method comprising: collecting, via a communications network, data metrics generated from a data center initialized using an Entity-Component-System (ECS) architecture including an entity, a component, and a system defined from information gathered from the data center; populating the component with a corresponding data metric from the data metrics; performing, by the system, an analysis on the data metric stored by the component to determine a state of the entity; based at least in part on the analysis on the data metrics, determining, by the system, an event has occurred to the state of the entity; and performing, by the system, an action to the entity causing the state of the entity to alter based on the event. Thus, the illustrative embodiment provides technological improvements over conventional techniques by implementing an ECS architecture that performs more efficient techniques (e.g., via reduced I/O)) for monitoring and analyzing data relating to a data center and its corresponding devices.

Clause 2. The method of clause 1, initializing the ECS architecture comprises: defining a data metric from the information collected in the data center as the component within the ECS architecture; defining a device of the data center as the entity within the ECS architecture; associating, via a context manager, the component to the entity; and generating a system in the ECS architecture for performing data analysis on the entity to monitor for events occurring on the data center, wherein the system is associated with the component.

Clause 3. The method of clause 1, or 2, further comprising: creating, upon initialization, a replicated data center using entities, components, and systems that mimic capabilities of the data center; removing a specified entity from the replicated data center; and evaluating effects in the replicated data center as a result of removing the specified entity.

Clause 4. The method of clause 1, or 2, or 3, wherein the entity corresponds to a hardware device operating within the data center.

Clause 5. The method of clause 1, or 2, or 3, or 4, wherein the component corresponds to a data metric collected from a device associated with the entity.

Clause 6. The method of clause 1, or 2, or 3, or 4, or 5, wherein the system performs data logic on the component to conduct data analysis relating to the data center.

Clause 7. The method of clause 1, or 2, or 3, or 4, or 5, or 6, wherein the event indicates that a data metric has exceeded a predetermined threshold determined by the system.

Clause 8. The method of clause 1, or 2, or 3, or 4, or 5, or 6, or 7, wherein the action comprises: creating a second component associated with the entity; populating the second component with an indicator of the event; and notifying a second system of the second component with the indicator.

Clause 9. A computerized system comprising: one or more processors; and computer storage memory having computer-executable instructions stored thereon which, when executed by the one or more processors, implement operations comprising: initializing an Entity-Component-System (ECS) architecture using information gathered from a data center, wherein the ECS architecture includes an entity, a component, and a system; collecting, via a communications network, data metrics generated from the data center; populating the component with a corresponding data metric from the data metrics; performing, by the system, an analysis on the data metric stored by the component to determine a state of the entity; determining, by the system, an event has occurred to the state of the entity as it relates to the system; and performing, by another system, an action to the entity causing the state of the entity to alter based on the event. Thus, the illustrative embodiment provides technological improvements over conventional techniques by implementing an ECS architecture that performs more efficient techniques (e.g., via reduced I/O) for monitoring and analyzing data relating to a data center and its corresponding devices.

Clause 10. The computerized system of clause 9, wherein initializing the ECS architecture comprises: defining a data metric from the information collected in the data center as the component within the ECS architecture; defining a device of the data center as the entity within the ECS architecture; associating, via a context manager, the component to the entity; and generating a system in the ECS architecture for performing data analysis on the entity to monitor for events occurring on the data center, wherein the system is associated with the component.

Clause 11. The computerized system of clause 9, or 10, further comprising: creating, upon initialization, a replicated data center using entities, components, and systems that mimic capabilities of the data center; removing a specified entity from the replicated data center; and evaluating effects in the replicated data center as a result of removing the specified entity.

Clause 12. The computerized system of clause 9, or 10, or 11, wherein the entity corresponds to a device operating within the data center.

Clause 13. The computerized system of clause 9, or 10, or 11, or 12, wherein the component corresponds to a data metric collected from a device associated with the entity.

Clause 14. The computerized system of clause 9, or 10, or 11, or 12, or 13, wherein the system performs data logic on the component to conduct data analysis relating to the data center.

Clause 15. The computerized system of clause 9, or 10, or 11, or 12, or 13, or 14, wherein the event indicates that a container, associated with the entity, is overprovisioned on the data center.

Clause 16. The computerized system of clause 9, or 10, or 11, or 12, or 13, or 14, or 15, wherein the action comprises: creating a second component associated with the entity; populating the second component with an indicator of the event; and notifying a second system of the second component with the indicator.

Clause 17. One or more computer storage media having computer-executable instructions embodied thereon that, when executed, by one or more processors, cause the one or more processors to perform operations comprising: initializing an Entity-Component-System (ECS) architecture using information gathered from a data center, wherein the ECS architecture includes an entity, a component, and a system; collecting, via a communications network, data metrics generated from the data center; populating the component with a corresponding data metric from the data metrics; performing, by the system, an analysis on the data metric stored by the component to determine a state of the entity; and determining, by the system, an event has occurred to the state of the entity as it relates to the system. Thus, the illustrative embodiment provides technological improvements over conventional techniques by implementing an ECS architecture that performs more efficient techniques (e.g., via reduced I/O) for monitoring and analyzing data relating to a data center and its corresponding devices.

Clause 18. The one or more computer storage media of clause 17, wherein initializing the ECS architecture comprises: defining a data metric from the information collected in the data center as the component within the ECS architecture; defining a device of the data center as the entity within the ECS architecture; associating, via a context manager, the component to the entity; and generating a system in the ECS architecture for performing data analysis on the entity to monitor for events occurring on the data center, wherein the system is associated with the component.

Clause 19. The one or more computer storage media of clause 17, or 18, further comprising: creating, upon initialization, a replicated data center using entities, components, and systems that mimic capabilities of the data center; removing a specified entity from the replicated data center; and evaluating effects in the replicated data center as a result of removing the specified entity.

Clause 20. The one or more computer storage media of clause 17, or 18, or 19 wherein the entity corresponds to a device operating within the data center.

What is claimed is:
1. A method comprising:
initializing an Entity-Component-System (ECS) architecture to create a digital replication of a data center by:
mapping a plurality of entities within the ECS architecture to a plurality of devices operating within the data center;
mapping a plurality of components within the ECS architecture to a plurality of data metrics for the data center, wherein the plurality of data metrics represents properties of the plurality of devices;
associating each of the plurality of components with at least one of the plurality of entities; and generating a plurality of systems in the ECS architecture, wherein each of the plurality of systems represents at least one of monitoring or conducting an analysis on at least one of the plurality of components;

collecting, via a communications network, the plurality of data metrics generated from the data center;

populating a component of the plurality of components with a corresponding data metric from the plurality of data metrics collected for the component;

performing, by a system of the plurality of systems, at least one of monitoring or conducting the analysis on the corresponding data metric stored by the component to determine a state of a device found in the plurality of devices represented by an entity found in the plurality of entities associated with the component, wherein the system performs the analysis on the corresponding data metric based at least in part on the system being associated with the component;

based at least in part on the analysis on the corresponding data metrics, determining, by the system, an event has occurred based at least in part on the state of the device; and performing, by the system and based at least in part on the event, an action to cause the state of the device to alter.

2. The method of claim 1, further comprising:

removing a specified entity from the plurality of entities; and performing, by a second system of the plurality of systems, an evaluation of an effect in the ECS architecture as a result of removing the specified entity.

3. The method of claim 1, wherein the system performs data logic on the component to conduct the analysis on the corresponding data metric.

4. The method of claim 1, wherein the event indicates that the corresponding data metric has exceeded a predetermined threshold as determined by the system via conducting the analysis.

5. The method of claim 1, wherein the action comprises:

creating a second component associated with the entity within the ECS architecture;

populating the second component with an indicator of the event; and notifying a second system of the plurality of systems of the second component with the indicator.

6. The method of claim 1, wherein the corresponding data metric is collected from the device and comprises at least one of a processing metric, a hard drive metric, a memory metric, a network metric, or an operating system-level metric.

7. A system comprising:

one or more processors; and computer storage memory having computer-executable instructions stored thereon which, when executed by the one or more processors, cause the one or more processors to perform operations comprising:

initializing an Entity-Component-System (ECS) architecture to create a digital replication of a data center using information gathered from the data center, the ECS architecture comprising an entity, a component, and a system, wherein initializing the ECS architecture involves:

mapping the entity within the ECS architecture to a device operating within the data center, mapping the component within the ECS architecture to a corresponding data metric for the data center, the corresponding data metric representing a property of the device, associating the component with the entity; and generating the system in the ECS architecture, the system representing at least one of monitoring or conducting an analysis on the component;

collecting, via a communications network, data metrics generated from the data center;

populating the component with the corresponding data metric from the data metrics;

performing, via the system, at least one of monitoring or conducting the analysis on the corresponding data metric stored by the component to determine a state of the device, wherein the system performs the analysis on the corresponding data metric based at least in part on the system being associated with the component;

determining, via the system, an event has occurred based at least in part on the state of the device; and performing, via a second system of the ECS architecture and based at least in part on the event, an action to cause the state of the device to alter.

8. The system of claim 7, wherein the operations further comprise:

removing a specified entity from the ECS architecture; and performing, via a third system of the ECS architecture, an evaluation of an effect in the ECS architecture as a result of removing the specified entity.

9. The system of claim 7, wherein the system performs data logic on the component to conduct the analysis on the corresponding data metric.

10. The system of claim 7, wherein the event indicates the device is overprovisioned on the data center.

11. The system of claim 7, wherein the action comprises:

creating a second component associated with the entity within the ECS architecture;

populating the second component with an indicator of the event; and notifying the second system of the second component with the indicator.

12. The system of claim 7, wherein the corresponding data metric is collected from the device and comprises at least one of a processing metric, a hard drive metric, a memory metric, a network metric, or an operating system-level metric.

13. One or more non-transitory computer storage media having computer-executable instructions embodied thereon that, when executed, by one or more processors, cause the one or more processors to perform operations comprising:

initializing an Entity-Component-System (ECS) architecture to create a digital replication of a data center using information gathered from the data center, the ECS architecture comprising an entity, a component, and a system, wherein initializing the ECS architecture involves:

mapping the entity within the ECS architecture to a device operating within the data center, mapping the component within the ECS architecture to a corresponding data metric for the data center, the corresponding data metric representing a property of the device, associating the component with the entity; and generating the system in the ECS architecture, the system representing at least one of monitoring or conducting an analysis on the component;

collecting, via a communications network, data metrics generated from the data center;

populating the component with the corresponding data metric from the data metrics;

performing, by the system, at least one of monitoring or conducting the analysis on the corresponding data metric stored by the component to determine a state of the device, wherein the system performs the analysis on the corresponding data metric based at least in part on the system being associated with the component;

determining, by the system, an event has occurred based at least in part on the state of the device; and performing, via the system and based at least in part on the event, an action to cause the state of the device to alter.

14. The one or more non-transitory computer storage media of claim 13, wherein the operations further comprise:

removing a specified entity from the ECS architecture; and performing, via a second system of the ECS architecture, an evaluation of an effect in the ECS architecture as a result of removing the specified entity.

15. The one or more non-transitory computer storage media of claim 13, wherein the corresponding data metric is collected from the device and comprises at least one of a processing metric, a hard drive metric, a memory metric, a network metric, or an operating system-level metric.

\* \* \* \* \*